(12) United States Patent
Zhong et al.

(10) Patent No.: US 10,388,262 B2
(45) Date of Patent: Aug. 20, 2019

(54) MESH-HEAD ELECTRONIC DRUM

(71) Applicant: Soundking Electronics & Sound Co., Ltd., Ningbo Zhejiang (CN)

(72) Inventors: Fazhi Zhong, Zhejiang (CN); Zonghui Du, Zhejiang (CN)

(73) Assignee: SOUNDKING ELECTRONICS & SOUND CO., LTD., Ningbo Zhejiang (CN)

( * ) Notice: Subject to any disclaimer, the term of this patent is extended or adjusted under 35 U.S.C. 154(b) by 0 days.

(21) Appl. No.: 15/546,204

(22) PCT Filed: Jan. 5, 2017

(86) PCT No.: PCT/CN2017/070264
§ 371 (c)(1),
(2) Date: Jul. 25, 2017

(87) PCT Pub. No.: WO2018/036081
PCT Pub. Date: Mar. 1, 2018

(65) Prior Publication Data
US 2019/0172435 A1    Jun. 6, 2019

(30) Foreign Application Priority Data

Aug. 23, 2016  (CN) .......................... 2016 1 0715194
Oct. 25, 2016  (CN) .......................... 2016 1 0952234

(51) Int. Cl.
*G10H 3/14*       (2006.01)
*G10D 13/02*      (2006.01)

(52) U.S. Cl.
CPC .......... *G10H 3/146* (2013.01); *G10D 13/024* (2013.01); *G10D 13/027* (2013.01); *G10H 2220/521* (2013.01); *G10H 2230/045* (2013.01)

(58) Field of Classification Search
CPC ..................................................... G10H 3/146
See application file for complete search history.

(56) References Cited

U.S. PATENT DOCUMENTS

2014/0060211 A1* 3/2014 Van den Broeck .... G10H 3/146
                                                  73/862.68

FOREIGN PATENT DOCUMENTS

CN       101410887 A    4/2009
CN       101853657 A    10/2010
(Continued)

OTHER PUBLICATIONS

Japanese Office Action for Application No. 2017-540276 dated Sep. 11, 2018.
(Continued)

*Primary Examiner* — Robert W Horn
(74) *Attorney, Agent, or Firm* — Patterson + Sheridan, LLP (57) ABSTRACT

The disclosure relates to a mesh-head electronic drum, including a drum base, a drum head, a data acquisition module and a data processing module, wherein the data acquisition module includes a trigger unit and a conduction medium, the conduction medium is a magnetic unit, the magnetic unit is arranged on the drum head, and the trigger unit includes a Hall sensor coupled with the magnetic unit in a non-contact way. The disclosure is advantageous in that the trigger unit and the conduction medium have no direct contact with each other and thus no bad contact is caused, but an accurate audio signal can still be generated.

9 Claims, 5 Drawing Sheets (56) References Cited

FOREIGN PATENT DOCUMENTS

| | | |
|---|---|---|
| CN | 201869170 U | 6/2011 |
| CN | 102831884 A | 12/2012 |
| CN | 106128441 A | 11/2016 |
| JP | S50138913 U | 11/1975 |
| JP | 2005301318 A | 10/2005 |
| JP | 2009237296 A | 10/2009 |
| WO | 2016005729 A2 | 1/2016 |

OTHER PUBLICATIONS

PCT International Search Report for PCT/CN2017/070264, dated May 11, 2017.

* cited by examiner

MESH-HEAD ELECTRONIC DRUM

TECHNICAL FIELD

The disclosure relates to an electronic drum, and more particularly, to a mesh-head electronic drum.

BACKGROUND

A mesh-head electronic drum is a common electronic percussion instrument, and generally includes a drum base, a drum head, a data acquisition module and a data processing module, wherein the drum head includes a drum hoop and a drum pad, and the drum hoop fixes the drum pad on the drum base. The drum pad is composed of two laminated mesh layers, and the data acquisition module includes a trigger unit and a conduction medium. The trigger unit adopts a piezoelectric ceramic buzzer, the conduction medium adopts an elastic buffer component, the elastic buffer component is located between a lower mesh layer and the piezoelectric ceramic buzzer, the elastic buffer component is in contact with both the lower mesh layer and the piezoelectric ceramic buzzer, and the piezoelectric ceramic buzzer is connected with the data processing module. When a user strikes the drum pad to generate a mechanical signal, the mechanical signal is damped by the elastic buffer component and then transmitted to the piezoelectric ceramic buzzer. The piezoelectric ceramic buzzer converts the mechanical signal into an electrical signal and sends the electrical signal to the data processing module, and the data processing module processes the received electrical signal to generate and output an audio signal.

In the existing mesh-head electronic drum, the piezoelectric ceramic buzzer serving as the trigger unit is in direct contact with the elastic buffer component serving as the conduction medium to receive the mechanical signal so as to generate the electrical signal. Therefore, the mesh-head electronic drum is a contact-type mesh-head electronic drum. The elastic buffer component transmits the mechanical signal generated when the drum pad is struck. Since the elastic buffer component is made of an elastic material, a long time pressing will change the size of the elastic buffer component, and thereby a bad contact between the elastic buffer component and the mesh layer is caused. In this case, the mechanical signal cannot be transmitted or the transmitted mechanical signal is damped, and thus the electronic drum generates no audio signal or a poor audio signal.

SUMMARY

An object of the disclosure is to provide a mesh-head electronic drum in which a trigger unit and a conduction medium have no direct contact with each other and thus no bad contact is caused, but an accurate audio signal can still be generated.

To solve the above technical problem, there is provided a mesh-head electronic drum, comprising a drum base, a drum head, a data acquisition module and a data processing module, wherein the data acquisition module comprises a trigger unit and a conduction medium, wherein the conduction medium is a magnetic unit, the magnetic unit is arranged on the drum head, and the trigger unit comprises a Hall sensor coupled with the magnetic unit in a non-contact way.

The magnetic unit comprises a magnet and a cushion pad, and the cushion pad is attached to an upper surface of the magnet.

The Hall sensor is mounted on a lower surface of a PCB, and an elastic buffer layer is attached to the upper surface of the PCB.

The magnetic unit is located in the drum pad, the Hall sensor is mounted in the drum base, and the Hall sensor is located below the magnetic unit.

The drum head comprises a drum hoop and a drum pad, wherein the drum hoop fixes the drum pad on the drum base, the drum pad is composed of at least two laminated mesh layers, and the magnetic unit is arranged between two adjacent mesh layers.

The drum pad is composed of four laminated mesh layers, the magnetic unit is arranged between two adjacent mesh layers, and the magnetic unit is clamped by the two adjacent mesh layers.

The data processing module comprises a shaping circuit, a digital-to-analog conversion circuit, a control circuit, a DSP data processing circuit, a sound source storage circuit, an analog-to-digital conversion circuit and a post-stage signal amplification circuit, wherein the Hall sensor is connected with an input end of the shaping circuit, an output end of the shaping circuit is connected with an input end of the digital-to-analog conversion circuit, an output end of the digital-to-analog conversion circuit is connected with an input end of the control circuit, an output end of the control circuit is connected with an input end of the DSP data processing circuit, an output end of the DSP data processing circuit is connected with an input end of the sound source storage circuit, an output end of the sound source storage circuit is connected with an input end of the analog-to-digital conversion circuit, an output end of the analog-to-digital conversion circuit is connected with an input end of the post-stage signal amplification circuit, and an output end of the post-stage signal amplification circuit outputs an audio signal.

The data processing module further comprises a preceding stage signal amplification circuit, wherein the Hall sensor is connected with the input end of the shaping circuit through the preceding stage signal amplification circuit, an input end of the preceding stage signal amplification circuit is connected with the Hall sensor, and an output end of the preceding stage signal amplification circuit is connected with the input end of the shaping circuit.

The preceding stage signal amplification circuit comprises a first resistor, a second resistor, a third resistor, a fourth resistor, a fifth resistor, a first capacitor, a second capacitor, a third capacitor and a transistor, wherein one end of the first capacitor is the input end of the preceding stage signal amplification circuit, the other end of the first capacitor is connected with one end of the first resistor, the other end of the first resistor, one end of the second resistor and one end of the third resistor are connected with a base of the transistor, the other end of the second resistor, one end of the fourth resistor and one end of the second capacitor are connected to a power supply, the other end of the second capacitor is grounded, the other end of the third resistor is grounded, the other end of the fourth resistor and a collector of the transistor are connected with one end of the third capacitor, an emitter of the transistor is connected with one end of the fifth resistor, the other end of the fifth resistor is grounded, and the other end of the third capacitor is the output end of the preceding stage signal amplification circuit.

Compared with the prior art, the disclosure has the following advantages. The mesh-head electronic drum comprises the drum base, the drum head, the data acquisition module and the data processing module, wherein the data acquisition module includes the trigger unit and the conduction medium, the conduction medium is the magnetic unit, the magnetic unit is arranged on the drum head, the trigger unit includes the Hall sensor coupled with the magnetic unit in a non-contact way, and the Hall sensor is connected with the data processing module. The magnetic unit generates a magnetic field. When the drum head is struck, the magnetic unit generates vibration, thus a distance from the magnetic unit to the Hall sensor changes, a range of magnetic field sensed by the Hall sensor changes, and an audio voltage signal is generated and output to the data processing module. The data processing module processes the received audio voltage signal to obtain a required audio signal output. In the mesh-head electronic drum according to the disclosure, the magnetic unit and the Hall sensor collaborative generate the audio voltage signal, the trigger unit and the conduction medium have no direct contact with each other, thereby no bad contact is caused, but an accurate audio signal can still be generated. Furthermore, when the drum head is struck, since the trigger unit and the conduction medium have no direct contact with each other, a force for striking the drum head is barely transmitted onto the drum base, and an edge detector detects no signal, thereby the drum head generates no influence on base edge. When the edge of the drum base is struck, a strong trigger signal is generated at the edge, the drum head basically generates no vibration, the magnetic flux of the magnetic unit does not change, and the Hall sensor basically does not produce any audio voltage signal, thereby the edge generates no influence on drum head.

When the magnetic unit includes the magnet and the cushion pad, and the cushion pad is attached to the upper surface of the magnet, it can be guaranteed that the magnetic unit is not directly struck in a striking process, thereby mechanical noise is avoided.

When the Hall sensor is mounted on the lower surface of the PCB, and the elastic buffer layer is attached to the upper surface of the PCB, loud mechanical noise, due to the deformation of the drum head caused by long time striking or due to direct striking on the PCB when the drum head is not properly tensioned and struck, can be avoided.

The data processing module includes the shaping circuit, the digital-to-analog conversion circuit, the control circuit, the DSP data processing circuit, the sound source storage circuit, the analog-to-digital conversion circuit and the post-stage signal amplification circuit, wherein the Hall sensor is connected with the input end of the shaping circuit, the output end of the shaping circuit is connected with the input end of the digital-to-analog conversion circuit, the output end of the digital-to-analog conversion circuit is connected with the input end of the control circuit, the output end of the control circuit is connected with the input end of the DSP data processing circuit, the output end of the DSP data processing circuit is connected with the input end of the sound source storage circuit, the output end of the sound source storage circuit is connected with the input end of the analog-to-digital conversion circuit, the output end of the analog-to-digital conversion circuit is connected with the input end of the post-stage signal amplification circuit, and the output end of the post-stage signal amplification circuit outputs an audio signal. Therefore, the audio voltage signal of the Hall sensor when the range of magnetic field changes can be processed to obtain the required audio signal.

The data processing module further includes the preceding stage signal amplification circuit, wherein the Hall sensor is connected with the input end of the shaping circuit through the preceding stage signal amplification circuit, the input end of the preceding stage signal amplification circuit is connected with the Hall sensor, and the output end of the preceding stage signal amplification circuit is connected with the input end of the shaping circuit. Accordingly, a smaller audio voltage signal of the Hall sensor when the range of magnetic field changes slightly can be amplified, so that the requirements for the audio input signal can be satisfied.

The preceding stage signal amplification circuit includes the first resistor, the second resistor, the third resistor, the fourth resistor, the fifth resistor, the first capacitor, the second capacitor, the third capacitor and the transistor, wherein one end of the first capacitor is used as the input end of the preceding stage signal amplification circuit, the other end of the first capacitor is connected with one end of the first resistor, the other end of the first resistor, one end of the second resistor and one end of the third resistor are connected with the base of the transistor, the other end of the second resistor, one end of the fourth resistor and one end of the second capacitor are connected to the power supply, the other end of the second capacitor is grounded, the other end of the third resistor is grounded, the other end of the fourth resistor and the collector of the transistor are connected with one end of the third capacitor, the emitter of the transistor is connected with one end of the fifth resistor, the other end of the fifth resistor is grounded, and the other end of the third capacitor is the output end of the preceding stage signal amplification circuit. Accordingly, the circuit has a simple structure and a low cost, and the audio voltage signal of the Hall sensor when the range of magnetic field changes can be amplified, so that the requirements for the audio input signal can be satisfied.

DETAILED DESCRIPTION

Mesh-head electronic drums of the disclosure will be further described below in detail with reference to accompanying drawings and examples.

Example 1: as shown in FIG. 1 to FIG. 4, a mesh-head electronic drum includes a drum base 1, a drum head, a data acquisition module and a data processing module. The drum head includes a drum hoop 2 and a drum pad 3. The drum hoop 2 fixes the drum pad 3 on the drum base 1. The data acquisition module includes a trigger unit and a conduction medium. The drum pad 3 is composed of four laminated mesh layers. The trigger unit includes a PCB 4 and a Hall sensor 5 mounted on a lower surface of the PCB 4. The conduction medium is a magnetic unit. The magnetic unit is arranged between a first mesh layer and a second mesh layer. The magnetic unit is clamped by the first mesh layer and the second mesh layer. The magnetic unit is located at the center of the drum pad 3. The PCB 4 is mounted in the drum base 1. The PCB 4 is right below the magnetic unit. The Hall sensor 5 is coupled with the magnetic unit in a non-contact way. The Hall sensor 5 is connected with the data processing module.

In the example, the magnetic unit includes a magnet 6 and a cushion pad 7. The cushion pad 7 is attached to an upper surface of the magnet 6. The cushion pad 7 is in contact with the first mesh layer, and a lower surface of the magnet 6 is in contact with the second mesh layer.

In the example, the Hall sensor 5 has a model number of A1388 or A1389.

Example 2: as shown in FIG. 1 to FIG. 4, a mesh-head electronic drum includes a drum base 1, a drum head, a data acquisition module and a data processing module. The drum head includes a drum hoop 2 and a drum pad 3. The drum hoop 2 fixes the drum pad 3 on the drum base 1. The data acquisition module includes a trigger unit and a conduction medium. The drum pad 3 is composed of four laminated mesh layers. The trigger unit includes a PCB 4 and a Hall sensor 5 mounted on a lower surface of the PCB 4. The conduction medium is a magnetic unit. The magnetic unit is arranged between a second mesh layer and a third mesh layer. The magnetic unit is clamped by the second mesh layer and the third mesh layer. The magnetic unit is located at the center of the drum pad 3. The PCB 4 is mounted in the drum base 1. The PCB 4 is right below the magnetic unit. The Hall sensor 5 is coupled with the magnetic unit in a non-contact way. The Hall sensor 5 is connected with the data processing module.

In the example, the magnetic unit includes a magnet 6 and a cushion pad 7. The cushion pad 7 is attached to an upper surface of the magnet 6. The cushion pad 7 is in contact with the second mesh layer, and a lower surface of the magnet 6 is in contact with the third mesh layer.

In the example, the Hall sensor 5 has a model number of A1388 or A1389.

Example 3: as shown in FIG. 1 to FIG. 4, a mesh-head electronic drum includes a drum base 1, a drum head, a data acquisition module and a data processing module. The drum head includes a drum hoop 2 and a drum pad 3. The drum hoop 2 fixes the drum pad 3 on the drum base 1. The data acquisition module includes a trigger unit and a conduction medium. The drum pad 3 is composed of four laminated mesh layers. The trigger unit includes a PCB 4 and a Hall sensor 5 mounted on a lower surface of the PCB 4. The conduction medium is a magnetic unit. The magnetic unit is arranged between a third mesh layer and a fourth mesh layer. The magnetic unit is clamped by the third mesh layer and the fourth mesh layer. The magnetic unit is located at the center of the drum pad 3. The PCB 4 is mounted in the drum base 1. The PCB 4 is right below the magnetic unit. The Hall sensor 5 is connected with the data processing module.

In the example, the magnetic unit includes a magnet 6 and a cushion pad 7. The cushion pad 7 is attached to an upper surface of the magnet 6. The cushion pad 7 is in contact with the third mesh layer, and a lower surface of the magnet 6 is in contact with the fourth mesh layer.

In the example, an elastic buffer layer is attached to the upper surface of the PCB 4.

In the example, the Hall sensor 5 has a model number of A1388 or A1389.

Example 4: as shown in FIG. 1 to FIG. 4, a mesh-head electronic drum includes a drum base 1, a drum head, a data acquisition module and a data processing module. The drum head includes a drum hoop 2 and a drum pad 3. The drum hoop 2 fixes the drum pad 3 on the drum base 1. The data acquisition module includes a trigger unit and a conduction medium. The drum pad 3 is composed of four laminated mesh layers. The trigger unit includes a PCB 4 and a Hall sensor 5 mounted on a lower surface of the PCB 4. The conduction medium is a magnetic unit. The magnetic unit is arranged between a third mesh layer and a fourth mesh layer. The magnetic unit is clamped by the third mesh layer and the fourth mesh layer. The magnetic unit is located at the center of the drum pad 3. The PCB 4 is mounted in the drum base 1. The PCB 4 is right below the magnetic unit. The Hall sensor 5 is coupled with the magnetic unit in a non-contact way. The Hall sensor 5 is connected with the data processing module.

In the example, the magnetic unit includes a magnet 6 and a cushion pad 7. The cushion pad 7 is attached to an upper surface of the magnet 6. The cushion pad 7 is in contact with the third mesh layer, and a lower surface of the magnet 6 is in contact with the fourth mesh layer.

In the example, an elastic buffer layer is attached to the upper surface of the PCB 4.

In the example, the Hall sensor 5 has a model number of A1388 or A1389.

Figure 1:
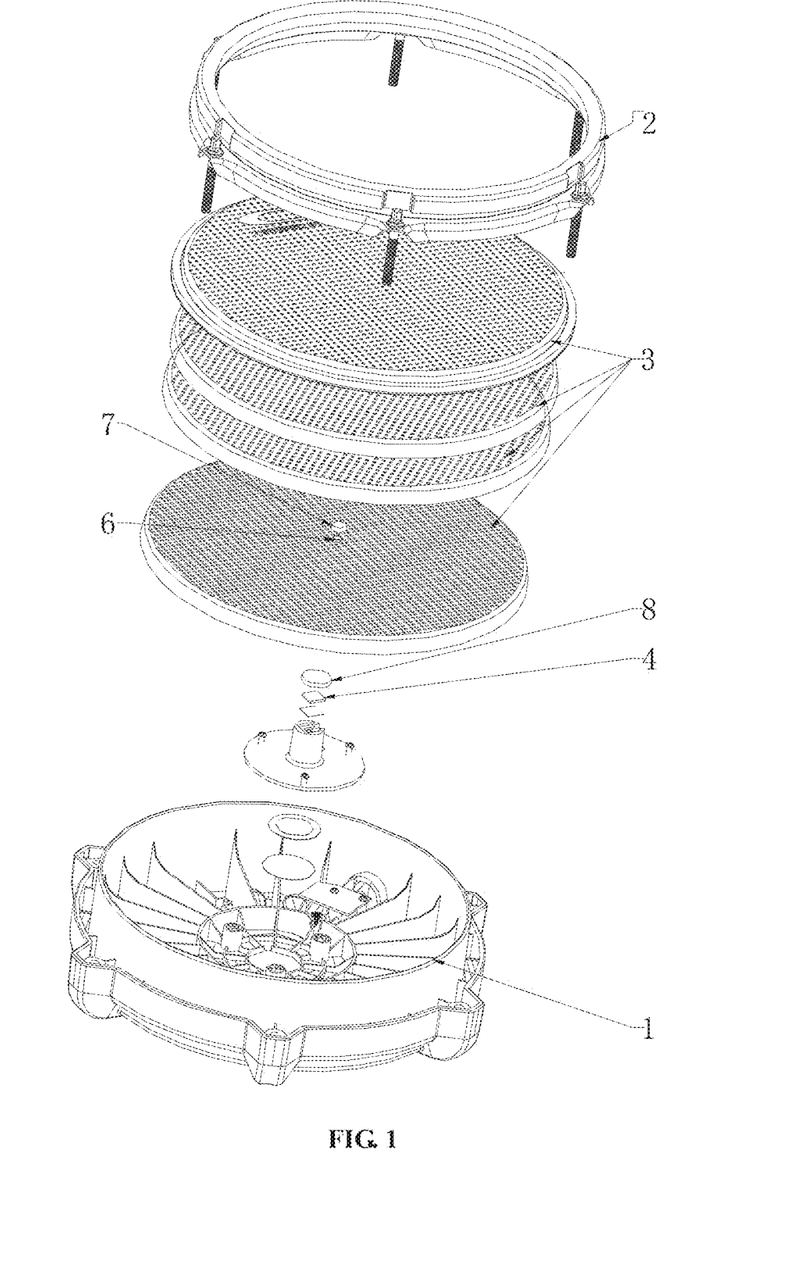
FIG. 1 is an exploded view of a mesh-head electronic drum according to the disclosure.
Figure 2:
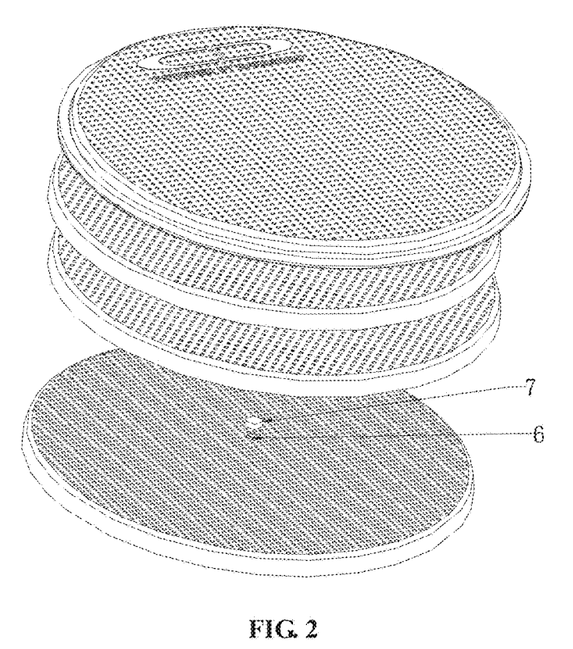
FIG. 2 is an exploded view of a drum head of a mesh-head electronic drum according to the disclosure.
Figure 3:
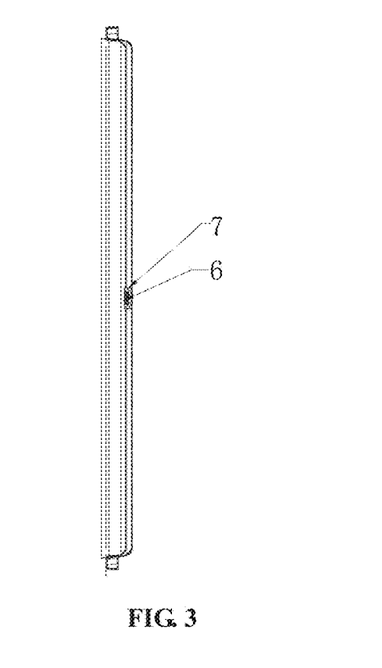
FIG. 3 is a sectional view of a mesh-head electronic drum according to the disclosure.
Figure 4:
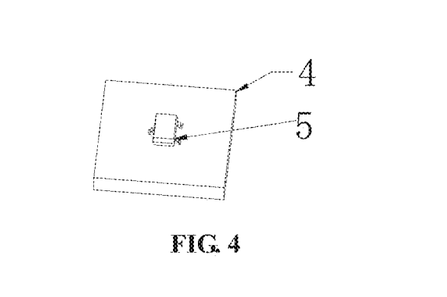
FIG. 4 is a structural diagram of a trigger unit of a mesh-head electronic drum according to the disclosure.
Figure 5:
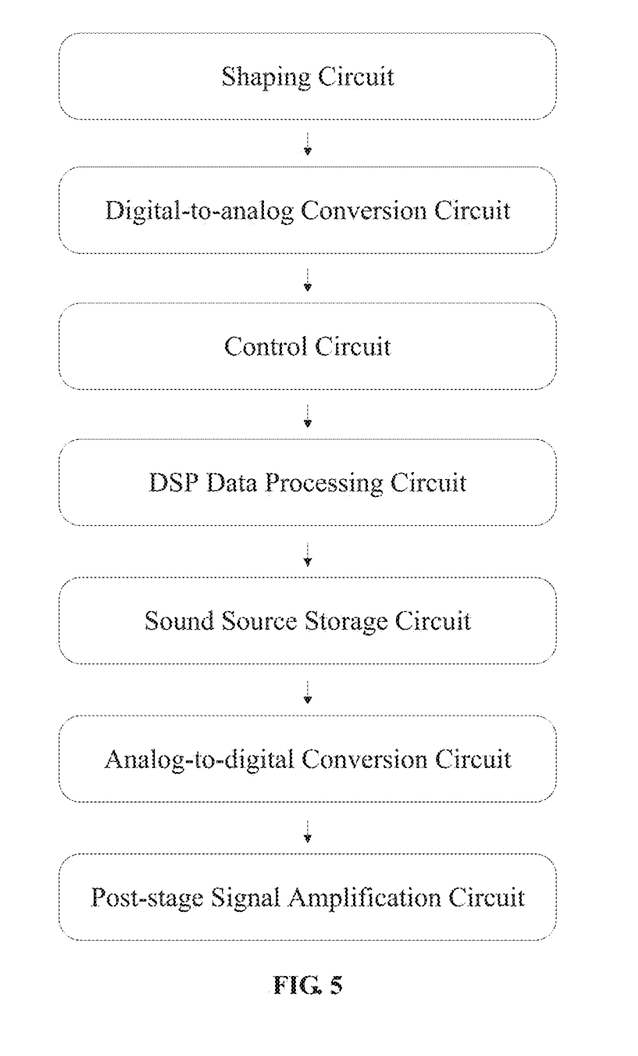
FIG. 5 is a schematic diagram of a data processing module of a mesh-head electronic drum according to a fourth example of the disclosure.

As shown in FIG. 5, in the example, the data processing module includes a shaping circuit, a digital-to-analog conversion circuit, a control circuit, a DSP data processing circuit, a sound source storage circuit, an analog-to-digital conversion circuit and a post-stage signal amplification circuit. The Hall sensor 5 is connected with an input end of the shaping circuit. An output end of the shaping circuit is connected with an input end of the digital-to-analog conversion circuit. An output end of the digital-to-analog conversion circuit is connected with an input end of the control circuit. An output end of the control circuit is connected with an input end of the DSP data processing circuit. An output end of the DSP data processing circuit is connected with an input end of the sound source storage circuit. An output end of the sound source storage circuit is connected with an input end of the analog-to-digital conversion circuit. An output end of the analog-to-digital conversion circuit is connected with an input end of the post-stage signal amplification circuit. An output end of the post-stage signal amplification circuit outputs an audio signal.

Example 5: as shown in FIG. 1 to FIG. 4, a mesh-head electronic drum includes a drum base 1, a drum head, a data acquisition module and a data processing module. The drum head includes a drum hoop 2 and a drum pad 3. The drum hoop 2 fixes the drum pad 3 on the drum base 1. The data acquisition module includes a trigger unit and a conduction medium. The drum pad 3 is composed of four laminated mesh layers. The trigger unit includes a PCB 4 and a Hall sensor 5 mounted on a lower surface of the PCB 4. The conduction medium is a magnetic unit. The magnetic unit is arranged between a second mesh layer and a third mesh layer. The magnetic unit is clamped by the second mesh layer and the third mesh layer. The magnetic unit is located at the center of the drum pad 3. The PCB 4 is mounted in the drum base 1. The PCB 4 is right below the magnetic unit. The Hall sensor 5 is coupled with the magnetic unit in a non-contact way. The Hall sensor 5 is connected with the data processing module.

In the example, the magnetic unit includes a magnet 6 and a cushion pad 7. The cushion pad 7 is attached to an upper surface of the magnet 6. The cushion pad 7 is in contact with the second mesh layer, and a lower surface of the magnet 6 is in contact with the third mesh layer.

In the example, an elastic buffer layer is attached to the upper surface of the PCB 4.

In the example, the Hall sensor 5 has a model number of A1388 or A1389.

Figure 6:
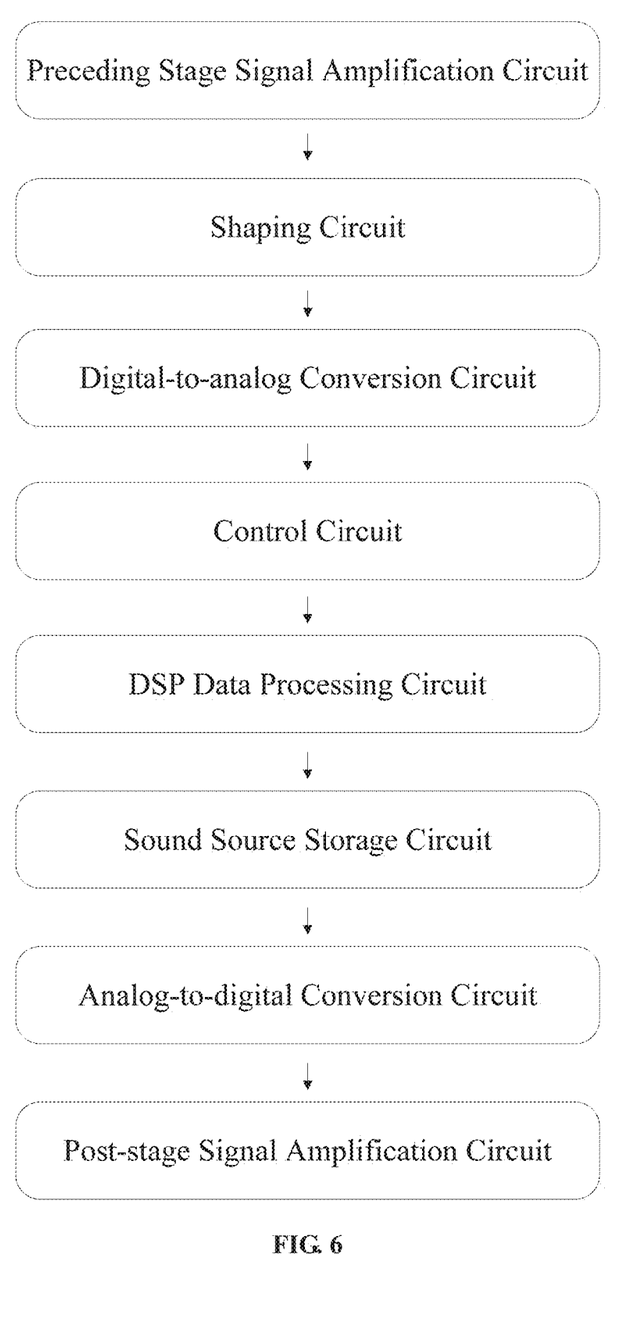
FIG. 6 is a schematic diagram of a data processing module of a mesh-head electronic drum according to a fifth example of the disclosure.

As shown in FIG. 6, in the example, the data processing module includes a preceding stage signal amplification circuit, a shaping circuit, a digital-to-analog conversion circuit, a control circuit, a DSP data processing circuit, a sound source storage circuit, an analog-to-digital conversion circuit and a post-stage signal amplification circuit. An input end of the preceding stage signal amplification circuit is connected with the Hall sensor 5, and an output end of the preceding stage signal amplification circuit is connected with an input end of the shaping circuit. An output end of the shaping circuit is connected with an input end of the digital-to-analog conversion circuit. An output end of the digital-to-analog conversion circuit is connected with an input end of the control circuit. An output end of the control circuit is connected with an input end of the DSP data processing circuit. An output end of the DSP data processing circuit is connected with an input end of the sound source storage circuit. An output end of the sound source storage circuit is connected with an input end of the analog-to-digital conversion circuit. An output end of the analog-to-digital conversion circuit is connected with an input end of the post-stage signal amplification circuit. An output end of the post-stage signal amplification circuit outputs an audio signal.

In the example, the preceding stage signal amplification circuit, the shaping circuit, the digital-to-analog conversion circuit, the control circuit, the DSP data processing circuit, the sound source storage circuit, the analog-to-digital conversion circuit and the post-stage signal amplification circuit each uses a well developed unit in the technical field.

Example 6: as shown in FIG. 1 to FIG. 4, a mesh-head electronic drum includes a drum base 1, a drum head, a data acquisition module and a data processing module. The drum head includes a drum hoop 2 and a drum pad 3. The drum hoop 2 fixes the drum pad 3 on the drum base 1. The data acquisition module includes a trigger unit and a conduction medium. The drum pad 3 is composed of four laminated mesh layers. The trigger unit includes a PCB 4 and a Hall sensor 5 mounted on a lower surface of the PCB 4. The conduction medium is a magnetic unit. The magnetic unit is arranged between a second mesh layer and a third mesh layer. The magnetic unit is clamped by the second mesh layer and the third mesh layer. The magnetic unit is located at the center of the drum pad 3. The PCB 4 is mounted in the drum base 1. The PCB 4 is right below the magnetic unit. The Hall sensor 5 is coupled with the magnetic unit in a non-contact way. The Hall sensor 5 is connected with the data processing module.

In the example, the magnetic unit includes a magnet 6 and a cushion pad 7. The cushion pad 7 is attached to an upper surface of the magnet 6. The cushion pad 7 is in contact with the second mesh layer, and a lower surface of the magnet 6 is in contact with the third mesh layer.

In the example, an elastic buffer layer is attached to the upper surface of the PCB 4.

In the example, the Hall sensor 5 has a model number of A1388 or A1389.

As shown in FIG. 6, in the example, the data processing module includes a preceding stage signal amplification circuit, a shaping circuit, a digital-to-analog conversion circuit, a control circuit, a DSP data processing circuit, a sound source storage circuit, an analog-to-digital conversion circuit and a post-stage signal amplification circuit. An input end of the preceding stage signal amplification circuit is connected with the Hall sensor 5, and an output end of the preceding stage signal amplification circuit is connected with an input end of the shaping circuit. An output end of the shaping circuit is connected with an input end of the digital-to-analog conversion circuit. An output end of the digital-to-analog conversion circuit is connected with an input end of the control circuit. An output end of the control circuit is connected with an input end of the DSP data processing circuit. An output end of the DSP data processing circuit is connected with an input end of the sound source storage circuit. An output end of the sound source storage circuit is connected with an input end of the analog-to-digital conversion circuit. An output end of the analog-to-digital conversion circuit is connected with an input end of the post-stage signal amplification circuit. An output end of the post-stage signal amplification circuit outputs an audio signal.

Figure 7:
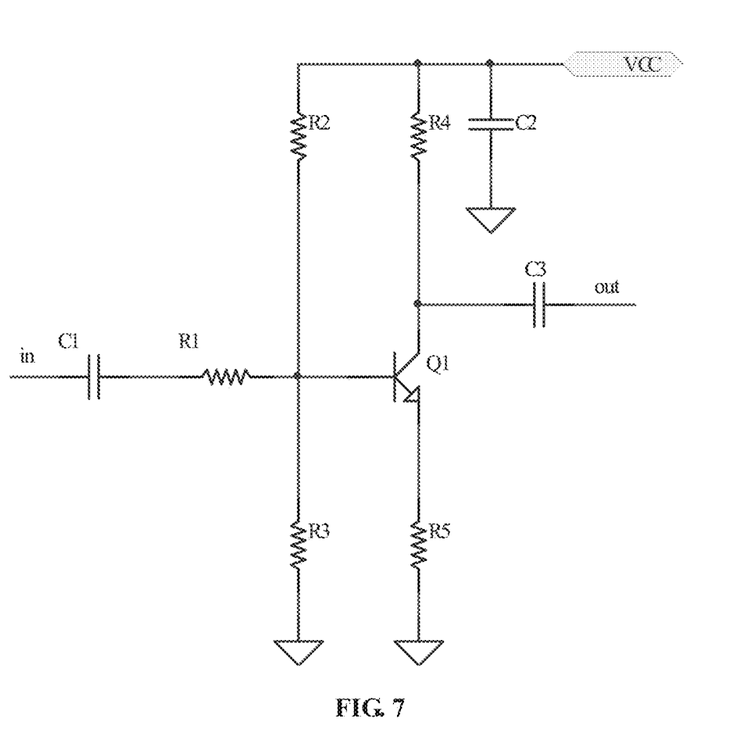
FIG. 7 is a circuit diagram of a preceding stage signal amplification circuit of a mesh-head electronic drum according to a sixth example of the disclosure.

As shown in FIG. 7, in the example, the preceding stage signal amplification circuit includes a first resistor R1, a second resistor R2, a third resistor R3, a fourth resistor R4, a fifth resistor R5, a first capacitor C1, a second capacitor C2, a third capacitor C3 and a transistor Q1. One end of the first capacitor C1 is the input end of the preceding stage signal amplification circuit, the other end of the first capacitor C1 is connected with one end of the first resistor R1. The other end of the first resistor R1, one end of the second resistor R2 and one end of the third resistor R3 are connected with a base of the transistor Q1. The other end of the second resistor R2, one end of the fourth resistor R4 and one end of the second capacitor C2 are connected to a power supply. The other end of the second capacitor C2 is grounded. The other end of the third resistor R3 is grounded. The other end of the fourth resistor R4 and a collector of the transistor Q1 are connected with one end of the third capacitor C3. An emitter of the transistor Q1 is connected with one end of the fifth resistor R5. The other end of the fifth resistor R5 is grounded. The other end of the third capacitor C3 is the output end of the preceding stage signal amplification circuit.

What is claimed is:

1. A mesh-head electronic drum, comprising a drum base, a drum head, a data acquisition module and a data processing module, wherein the data acquisition module comprises a trigger unit and a conduction medium, wherein the conduction medium is a magnetic unit, the magnetic unit is arranged on the drum head, and the trigger unit comprises a Hall sensor coupled with the magnetic unit in a non-contact way.

2. The mesh-head electronic drum of claim 1, wherein the magnetic unit comprises a magnet and a cushion pad, and the cushion pad is attached to an upper surface of the magnet.

3. The mesh-head electronic drum of claim 1, wherein the Hall sensor is mounted on a lower surface of a PCB, and an elastic buffer layer is attached to the upper surface of the PCB.

4. The mesh-head electronic drum of claim 1, wherein the magnetic unit is located in the drum pad, the Hall sensor is mounted in the drum base, and the Hall sensor is located below the magnetic unit.

5. The mesh-head electronic drum of claim 1, wherein the drum head comprises a drum hoop and a drum pad, wherein the drum hoop fixes the drum pad on the drum base, the drum pad is composed of at least two laminated mesh layers, and the magnetic unit is arranged between two adjacent mesh layers.

6. The mesh-head electronic drum of claim 5, wherein the drum pad is composed of four laminated mesh layers, the magnetic unit is arranged between two adjacent mesh layers, and the magnetic unit is clamped by the two adjacent mesh layers.

7. The mesh-head electronic drum of claim 1, wherein the data processing module comprises a shaping circuit, a digital-to-analog conversion circuit, a control circuit, a DSP data processing circuit, a sound source storage circuit, an analog-to-digital conversion circuit and a post-stage signal amplification circuit, wherein the Hall sensor is connected with an input end of the shaping circuit, an output end of the shaping circuit is connected with an input end of the digital-to-analog conversion circuit, an output end of the digital-to-analog conversion circuit is connected with an input end of the control circuit, an output end of the control circuit is connected with an input end of the DSP data processing circuit, an output end of the DSP data processing circuit is connected with an input end of the sound source storage circuit, an output end of the sound source storage circuit is connected with an input end of the analog-to-digital conversion circuit, an output end of the analog-to-digital conversion circuit is connected with an input end of the post-stage signal amplification circuit, and an output end of the post-stage signal amplification circuit outputs an audio signal.

8. The mesh-head electronic drum of claim 7, wherein the data processing module further comprises a preceding stage signal amplification circuit, wherein the Hall sensor is connected with the input end of the shaping circuit through the preceding stage signal amplification circuit, an input end of the preceding stage signal amplification circuit is connected with the Hall sensor, and an output end of the preceding stage signal amplification circuit is connected with the input end of the shaping circuit.

9. The mesh-head electronic drum of claim 8, wherein the preceding stage signal amplification circuit comprises a first resistor, a second resistor, a third resistor, a fourth resistor, a fifth resistor, a first capacitor, a second capacitor, a third capacitor and a transistor, wherein one end of the first capacitor is the input end of the preceding stage signal amplification circuit, the other end of the first capacitor is connected with one end of the first resistor, the other end of the first resistor, one end of the second resistor and one end of the third resistor are connected with a base of the transistor, the other end of the second resistor, one end of the fourth resistor and one end of the second capacitor are connected to a power supply, the other end of the second capacitor is grounded, the other end of the third resistor is grounded, the other end of the fourth resistor and a collector of the transistor are connected with one end of the third capacitor, an emitter of the transistor is connected with one end of the fifth resistor, the other end of the fifth resistor is grounded, and the other end of the third capacitor is the output end of the preceding stage signal amplification circuit.

* * * * *